United States Patent
Fujimichi (10) Patent No.: US 6,314,291 B1
(45) Date of Patent: Nov. 6, 2001

(54) HOME LOCATION REGISTER CONTROLLER CAPABLE OF DEALING WITH CONGESTION WITHOUT RESTRICTION OF ACCESS

(75) Inventor: Hiroshi Fujimichi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/313,286

(22) Filed: May 18, 1999

(30) Foreign Application Priority Data

May 18, 1998 (JP) .................................................. 10-135637

(51) Int. Cl.[7] ...................................................... H04Q 7/20
(52) U.S. Cl. ........................ 455/433; 455/435; 455/422; 455/412
(58) Field of Search ..................................... 455/433, 435, 455/445, 456, 422, 432, 412, 405, 9, 67.1

(56) References Cited

U.S. PATENT DOCUMENTS 5,123,111  6/1992  Delory et al. .
5,594,942 * 1/1997 Antic et al. .......................... 455/67.1
5,623,532 * 4/1997 Houde et al. .
5,953,662 * 9/1999 Lindquist et al. .................... 455/433

FOREIGN PATENT DOCUMENTS 4-347995  12/1992  (JP) .
6-209489   7/1994  (JP) .

* cited by examiner

Primary Examiner—Doris H. To
(74) Attorney, Agent, or Firm—Foley & Lardner (57) ABSTRACT

A home location register controller comprises a monitoring section and a main control section. The monitoring section is connected to an active home location register to monitor simultaneous access from a mobile services switching center to the active home location register. The monitoring section produces a monitoring signal representative of the number of the simultaneous access. The main control section is connected to the monitoring section and the mobile services switching center and decides whether congestion is happened in the active home location register or not on the basis of the monitoring signal. The main control section partially changes destination of access produced by the mobile services switching center from the active home location register to a standby home location register.

15 Claims, 6 Drawing Sheets

HOME LOCATION REGISTER CONTROLLER CAPABLE OF DEALING WITH CONGESTION WITHOUT RESTRICTION OF ACCESS

BACKGROUND OF THE INVENTION

This invention relates to a home location register controller used in a mobile communication system, such as a mobile telephone system, a personal handy phone system (PHS), or the like, particularly, relates to a home location register controller capable of dealing with congestion of access for a home location register (HLR) of the mobile communication system.

A conventional mobile communication system has mobile services switching centers (MSCs), a home location register, and mobile stations for subscribers. The home location register stores a database including information of the subscribers and the mobile stations. The home location register is accessed by the mobile services switching centers to carry out routing circuits and to serve other value added services.

Recently, with the expansion of a service area of the mobile communication system and with the rapid increase of subscribers, addition of mobile services switching centers is being made. In addition, the value added services is increasing in the number of kinds to meet the various requests of the subscribers. In consequence, access from the mobile services switching centers to the home location resistor is rapidly increasing. Thus, the mobile communication system is constructed so that the use of the mobile communication system is effectively made after consideration is made about the maximum access traffic in the home location register.

However, when unexpected number of access to the home location register happen, congestion is happened in the home location registers. With the increase of the subscribers and with the increase of kinds of the value added services, the congestion will frequently happen. Thus, the congestion must be dissolved to supply an efficient communication service in the mobile communication system.

Though restricting call origination for a predetermined time dissolves the congestion, the restricted mobile terminals repeat call generation. As a result, other congestion happens in base stations and the mobile services switching centers. Thus, it is undesirable to restrict call origination.

SUMMARY OF THE INVENTION

It is therefore an object of this invention to provide a home location register controller that can deal with congestion in a home location register without restriction of access to the home location register.

It is another object of this invention to provide a method of controlling a home location register to deal with congestion in the home location register without restriction of access to the home location register.

It is still another object of this invention to provide a recording medium recording a program for controlling a home location register to deal with congestion in the home location register without restriction of access to the home location register.

Other object of this invention will become clear as the description proceeds.

On describing the gist of this invention, it is possible to understand that a home location register controller is used in a mobile communication system including a mobile services switching center, an active home location register connected to the mobile services switching center, and a standby home location register connected to the active home location register.

According to the gist of this invention, the home location register controller comprises a monitoring unit which is connected to the active home location register to monitor simultaneous access from the mobile services switching center to the active home location register and to produce a monitoring signal representative of the number of the simultaneous access. A control unit is connected to center to decide whether congestion is happened in the active home location register or not on the basis of the monitoring signal and to partially change destination of access produced by the mobile services switching center from the active home location register to the standby home location register.

According to another gist of this invention, a method is for controlling a home location register system having an active home location register and a standby home location register connected to each other. The home location register system is used in a mobile communication system including a mobile services switching center connected to said active home location register. The method comprising the steps of monitoring simultaneous access from the mobile services switching center to the active home location register to produce a monitoring signal representative of the number of the simultaneous access, deciding whether congestion is happened in the active home location register or not on the basis of the monitoring signal, and partially changing destination of access produced by the mobile services switching center from the active home location register to the standby home location register.

According to still another gist of this invention, a recording medium has a recorded program for controlling a home location register system having an active home location register and a standby home location register connected to each other. The home location register system is used in a mobile communication system including a mobile services switching center connected to the active home location register. The recorded program comprises a monitoring section for monitoring simultaneous access from the mobile services switching center to the active home location register to produce a monitoring signal representative of the number of the simultaneous access. A control section is related to the monitoring section for deciding whether congestion is happened in the active home location register or not on the basis of the monitoring signal to partially change destination of access produced by the mobile services switching center from the active home location register to the standby home location register.

DESCRIPTION OF THE PREFERRED EMBODIMENT

Referring to FIGS. 1 through 6, description will proceed to a home location register controller according to a preferred embodiment of this invention.

Figure 1:
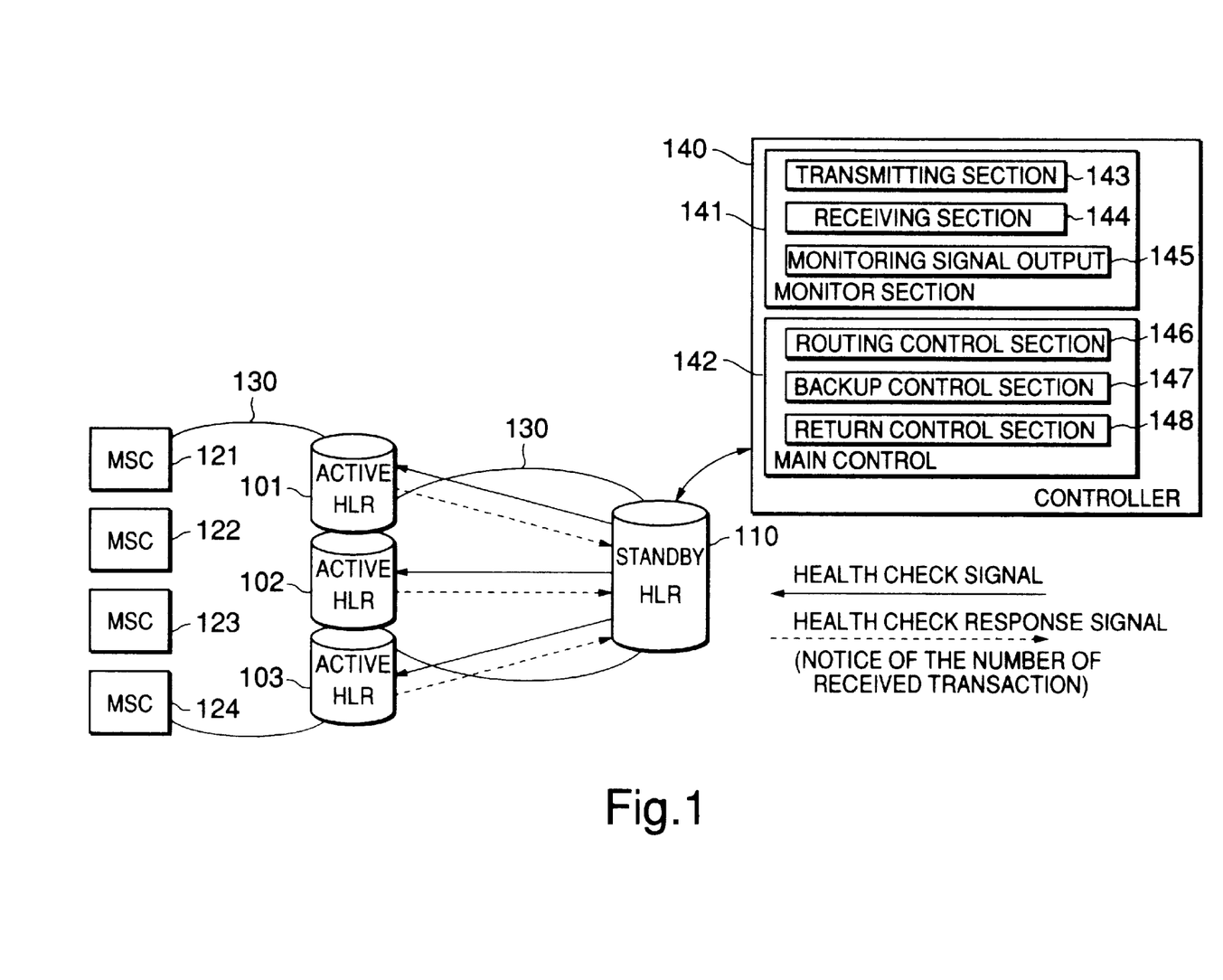
FIG. 1 shows a mobile communication system having a home location register controller according to a preferred embodiment of this invention.

In FIG. 1, a mobile communication system is a personal handy phone network system and has three active home location registers (ACTIVE HLRs) 101–103, a standby home location register (STANDBY HLR) 110, four mobile services switching center (MSCs) 121–124, a local area network 130, and a home location register controller 140.

The mobile communication system uses a set of subscriber data units to carry out routing and to provide value added services. Each of the subscriber data units includes a subscriber number assigned to a subscriber. The subscriber number is used for distinguishing each subscriber data unit from other subscriber data units. The set of subscriber data units is divided into a plurality of divided sets to be assigned to the active home location registers 101–103. Each of the active home location registers 101–103 memorizes an assigned divided set of the subscriber data units. Each of the active home location registers 101–103 divides the assigned divided set into a plurality of subscriber data blocks to manage them.

The standby home location register 110 is connected to the active home location registers 101–103 through the local area network 130. The standby home location register 110 memorizes a backup data (or has a backup database) of the set of the subscriber data units and periodically check the backup data with the subscriber data sets memorized in the active home location registers 101–103 to renew the backup data.

The mobile services switching center 121–124 are connected to the active home location registers 101–103 through the local area network 130. Each of the mobile services switching centers 121–124 has a routing table (GT routing table) to access to the active location registers 101–103. The routing table includes routing information that shows relations between the subscriber numbers and destinations of access. The mobile services switching centers 121–124 access to the active home location register on the basis of the routing table to read out or rewrite the subscriber data units.

The local area network 130 connects the active home location resistor 101–103, the standby home location resistor 110, and the mobile services switching center to one another.

The home location register controller 140 is connected to the standby home location register 110 and comprises a monitor section 141 and main control section 142.

The monitor section 141 includes a transmitting section 143, a receiving section 144, and a monitoring signal output section 145. The transmitting section 143 periodically transmits health check signals to the active home location registers 101–103 through the standby home location register 110 and the local area network 130. The receiving section 144 receives health check response signals from the active home location registers 101–103. The monitoring signal output section 145 produces monitoring signals in response to the health check response signals to supply the main control section 142.

The main control section 142 has a routing control section 146, a backup control section 147, and a return control section 148. The routing control section 146 decides whether congestion is happened in the active home location registers 101–103 on the basis of the monitoring signals. If any monitoring signals indicate the congestion, the routing control section 146 orders the mobile service switching centers 121–124 to partially changed the destination of access. The backup control section 147 periodically makes the standby home location resistor 110 check the subscriber data units memorized in the active home location registers 101–103 to renew the backup data when the destination is not happened in any active home location registers 101–103. The return control section 148 makes the standby home location resistor 110 supply the backup data to the active home location registers 101–103 to renew the subscriber data units memorized in the active home location registers 101–103 when the congestion is dissolved.

The home location register controller 140 is, for example, realized by a central processing unit (CPU) and a recording medium, such as an optical disc, a photomagnetic disc, a semiconductor memory, a magnetic disc, or the like. In this case, the recording medium has a program which can be executed by the CPU and which is for controlling the standby home location resister 110.

An operation of the mobile communication system will be described in below.

In the personal handy phone network system, it hardly seems that a certain mobile terminal is deluged with many calls because the subscriber number is assigned to an individual mobile terminal. On the other hand, it is probable that many mobile terminals generate calls in a short time. In this case, much access for the active home location registers 101–103 is carried out by the mobile services switching centers 121–124. Accordingly, it is probable that congestion is happened in not only one but also plural active home location registers. However, description will be made about only one of the active home location registers 101–103 in the following.

Figure 2:
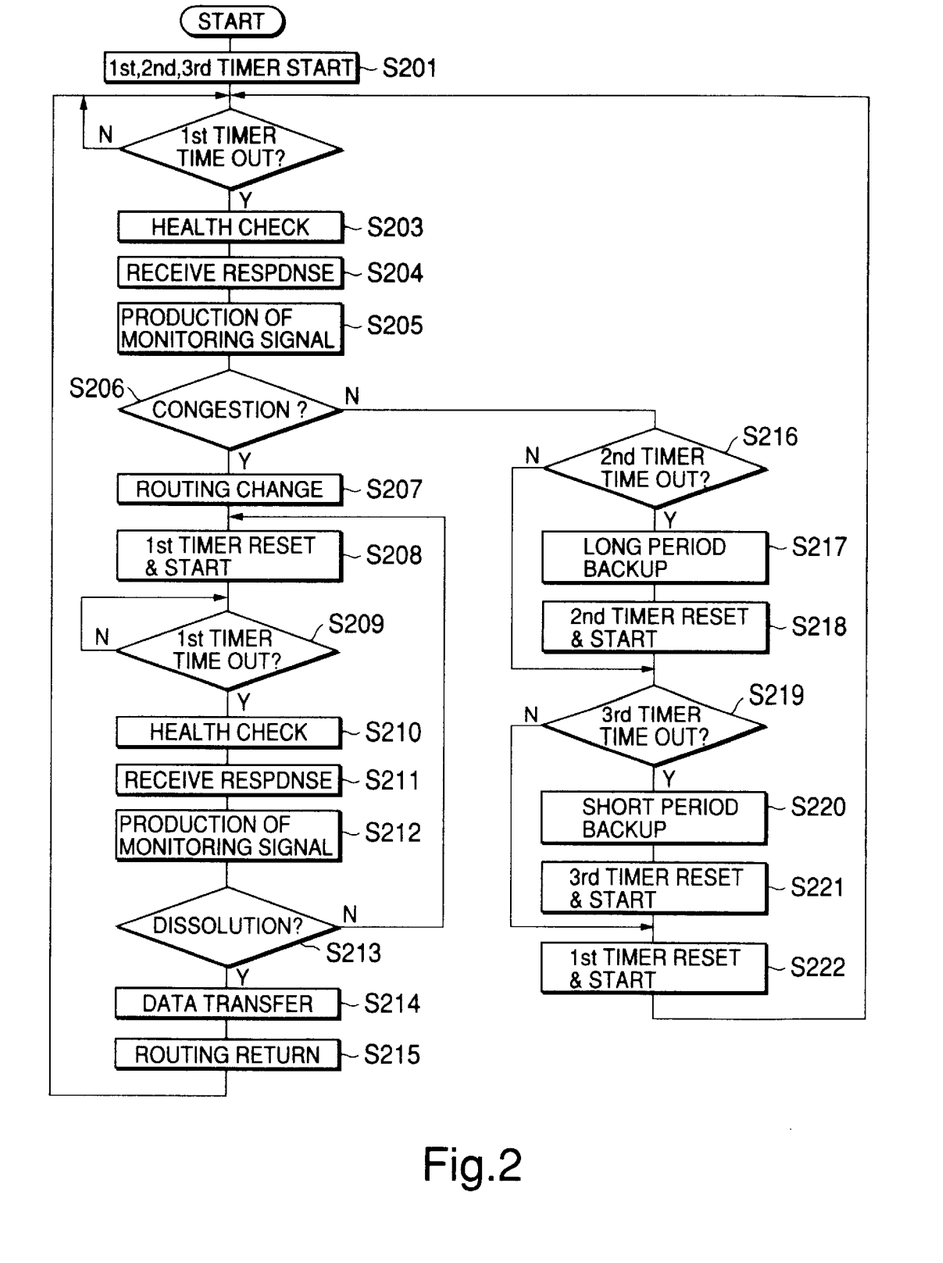
FIG. 2 is a flow chart showing an operation of the home location register controller of FIG. 1.

Referring to FIG. 2, the home register controller 140 operates as follows.

At a step S201, the home register controller 140 starts first, second, and third timers (not shown). The first timer is used for deciding a timing of health check on the active home location register and takes, for example, a few minutes until time out. The second timer is used for deciding a timing of long period backup for the standby home location register 110 and takes, for example, a twenty-four hours until time out. The third timer is used for deciding a timing of short period backup for the standby home location register 110 and takes, for example, an hour until time out.

If the first timer is in the time out (S202), the transmitting section 143 transmits the health check signal to the active home register through the standby home location register at a step S203. Then, the receiving section 144 receives the health check response signal transmitted from the active home register through the standby home location register at a step S204. At a step 205, the monitoring signal output section 145 produces a monitoring signal on the basis of the health check response signal to supply it to the routing control section 146.

The routing control section 146 judges whether the congestion is happened or not in the active home location register at a step S206. If the congestion is happened, the step 206 goes to a step S207. On the other hand, the congestion is not happened, the step 206 goes to a step S216.

When the congestion is happened, the routing control section 146 order each of the mobile services switching centers 121–124 to change the routing table from an original state to an ordered state through the standby home location register 110 and the local area network 130.

Steps S208 through S212 correspond to the steps 201 through S205. These steps S208–S212 are repeated in the home register controller 140 until the congestion is dissolved.

At a step S213, the routing control section 146 judges whether the congestion is dissolved or not. When the congestion continues, the step S213 returns to the step S208. In this case, further routing change process as the step S207 may be carried out by the routing control section 146. When the congestion is dissolved, the step S213 goes to a step S214.

At a step S214, the backup control section 147 transfer the backup data to the active home location register.

At a step S215, the return control section 148 orders all of the mobile services switching centers to return the routing tables to the original state. Then, the step S215 returns to the step S202.

When it is judged that the congestion is not happened at the step S206, the home location register controller 140 judges whether the second timer is in the time out or not at the step S216. If the second timer is in the time out, the backup control section 147 orders the standby home location register 110 to duplicate the subscriber data memorized in the active home location resister about long period subscriber data which includes present position data, destination data for call forwarding, or the like. Then, the home location register controller 140 resets and starts the second timer.

When it is judged that the second timer is not in the time out or the step S218 is processed, the home location register controller 140 judges whether the third timer is in the time out or not at a step S219. If the third timer is in the time out, the backup control section 147 orders the standby home location register 110 to duplicate the subscriber data memorized in the active home location resister about short period subscriber data which includes service contract data. The service contract data represents an added value service class, user identifier, subscriber telephone number, and others. Then, the home location register controller 140 resets and starts the second timer at a step S221 and the first timer at a step S222. The step S222 returns to the step S 202.

As mentioned above, the home location register controller 140 operates.

Next, operation of the standby home location register 110, the active home location register 101, (102, or 103), and the mobile services switching center 121 (122, 123, or 124) will be described in the following.

Figure 3:
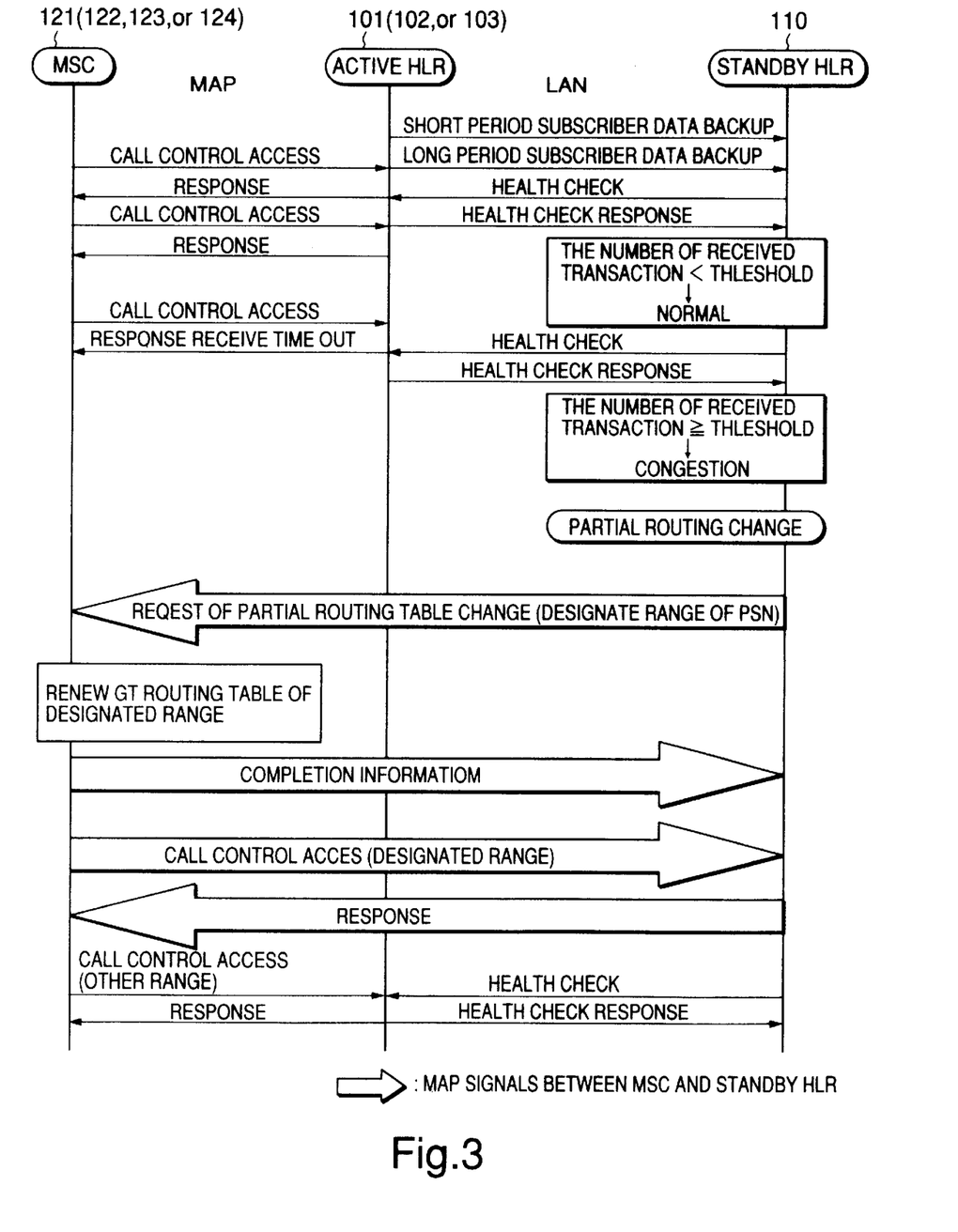
FIG. 3 is a sequence chart for describing an operation of the mobile communication system of FIG. 1.

Referring to FIG. 3, the mobile services switching center 121 transmits call control access signals to the active home location register 101. The active home location register 101 responds to the call control access signals. The mobile services switching center 121 and the active home location register 101 adopts the signaling system No. 7 and operates as shown in FIG. 4.

Figure 4:
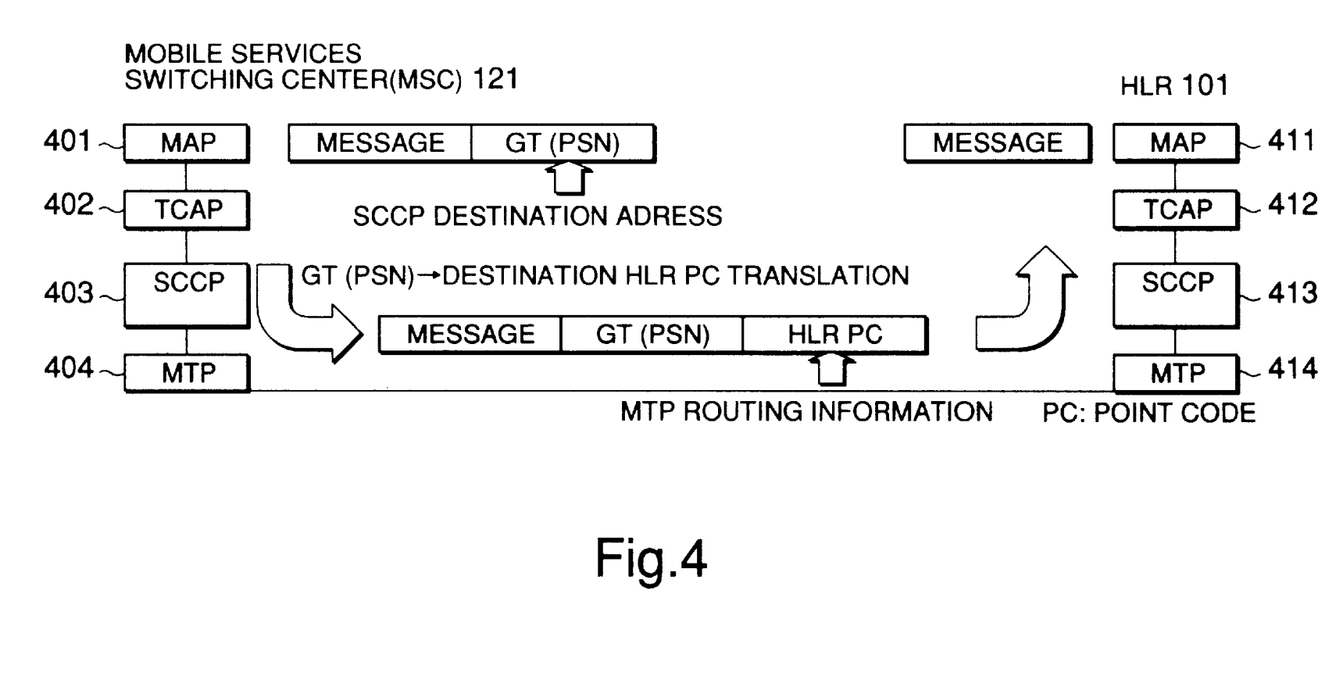
FIG. 4 is a block diagram for describing an operation of a mobile services switching center and a active home location register of the mobile communication system of FIG. 1.

In FIG. 4, the mobile services switching center 121 has a mobile application part (MAP) 401, a transaction capabilities application part (TCAP) 402, a signaling connection control part (SCCP) 403, and a message transfer part (MTP) 404. Similarly, the active location register 101 has a mobile application part (MAP) 411, a transaction capabilities application part (TCAP) 412, a signaling connection control part (SCCP) 413, and a message transfer part (MTP) 414. In addition, the mobile services switching center 121 further has a application part (not shown) which is a software layer on the mobile application part 401.

When call control access is required by the application part in the mobile services switching center 121, the mobile application part 401 produces a message of a demand type for reading out a certain subscriber data unit from the active home location register 101 or for rewriting the certain subscriber data unit memorized in the active home location register 101. In this event, the mobile application part 401 adds a personal subscriber number (PSN) relating the certain subscriber data unit as a global title (GT) for the signaling connection control part 403. The mobile application part 401 transfers the message to the signaling connection control part 403 through the transaction capabilities application part 402.

The signaling connection control part 403 refers to the GT routing table (not shown) and finds a point code (PC) which is assigned to the active home location register memorizing the certain subscriber data unit. Herein, it is assumed that the point code is assigned to the active home location register 101. This function in the signaling connection control part 403 is called a global title translation function. The signaling connection control part 403 adds the point code to the message with the global title. The signaling connection control part 403 transfer the message with both the global title and the point code to the message transfer part 404. The message transfer part 404 transfers the message to the local area network 130 (see FIG. 1) as the call control access signal.

The active home location register 101 receives all of call control signals transmitted on the local area network 130. The message transfer part 414 compares the point code included in the received call control signal with the point code assigned to the message transfer part 414. When the point code included in the received call control signal is equal to the point code assigned to the active home location register 101, the message transfer part 414 transfer the received call control signal to the signal connection control part 413.

The signal connection control part 413 refers to a GT routing table (not shown) which is provided in the active home location register 101 and which is different from the GT routing table of the mobile services switching center to find a point code relating to the global title included in the received call control signal. The signal connection control part 413 transfers the message included in the received call control signal to the mobile application part 411 through the transaction capabilities application part 412 when the found point code is equal to the point code assigned to the active home location register. The mobile application part 411 operates to answer the message.

The response signal is transmitted from the active home location register 101 to the mobile services switching center 121 in reverse process to above mentioned process.

Returning to FIG. 3, the short period subscriber data backup, long period subscriber data backup, and the health check are carried out between the active home location register 101 and the standby home location resister 110 under control by the home location register controller 140.

When the active home location register 101 receives the health check signal, it counts the number of received transactions held in a queue (not shown). Namely, the active home location register 101 counts the number of received call control access signals held in the queue at a time. The active home location produces the health check response signal which represents the counted value.

The home location register controller 140 has a predetermined threshold value. When the counted value is less than the threshold value, the home location register controller 140 judges that the active location register 101 normally operates.

On the other hand, when the counted value is not less than the threshold value, the home location register controller 140 judges that the congestion is happened in the active home location register 101. In this case, it is probable that the active home location register does not answer the call control access signal held in the queue. Namely, the active home location register 101 deletes the call control access signal held in the queue when a predetermined time elapses from the call control access signal is received by the active home location register.

When the congestion is happened in the active home location register 101, the home location register controller 140 orders all of the mobile services switching centers to change the GT routing tables for the original state to the ordered state. Namely, the home location register controller 140 designates at least one of the subscriber data blocks to change the GT routing table provided in each mobile services switching center.

Figure 5:
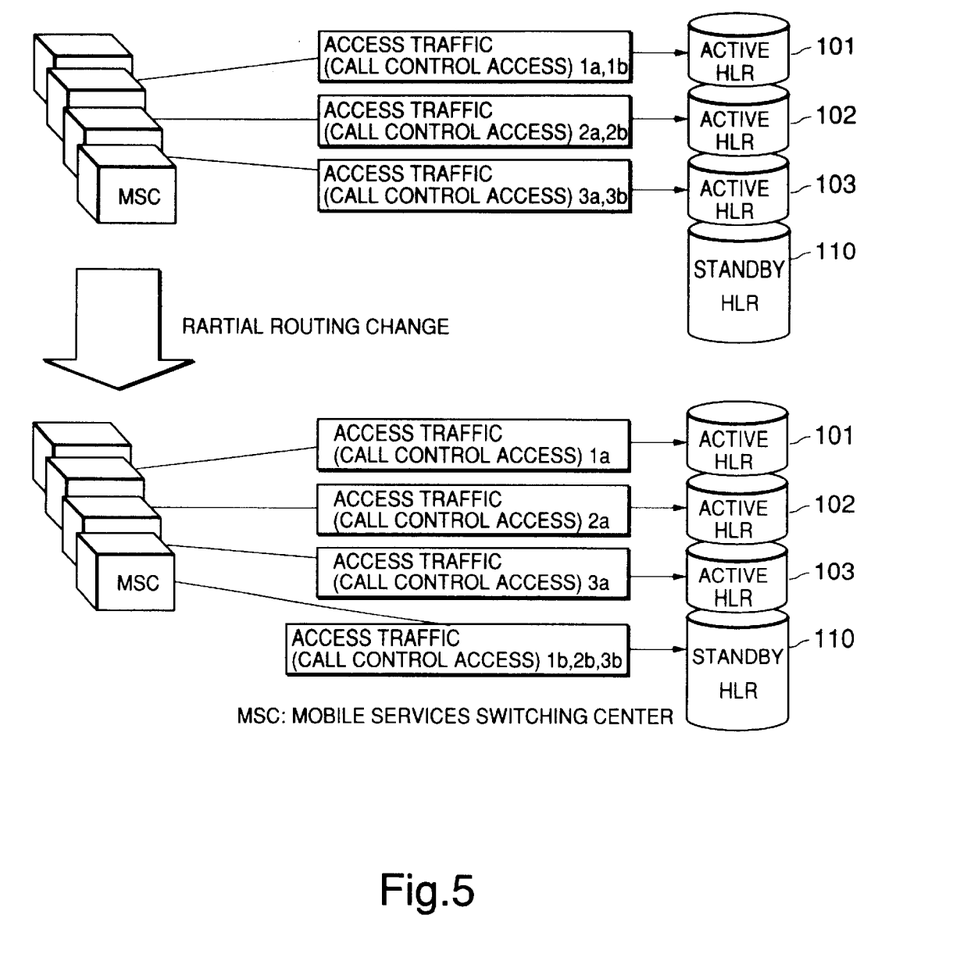
FIG. 5 shows a condition of the access traffic between the mobile services switching centers and the active home location registers.

Each of the mobile services switching centers changes the point code included in the designated subscriber data block (s) from the code assigned to the active home location register to the code assigned to the standby home location register. The mobile services switching centers inform the completion of the change (or the renewal) of the GT, routing table to the home location register controller 140 through the local area network 130 and the standby home location register 110. After this, the mobile services switching centers transmit the call control access signals relating the designated rages to the standby home location register 110. Change of traffic of the call control access signals is shown in FIG. 5. In FIG. 5, a state before the change of the GT routing table is shown upper side while a state after the change of the GT routing table is shown lower side.

Returning to FIG. 3, when the standby home location register 110 receives the call control access signals, it processes the call control access signals like the active home location register 101 by the use of the backup database memorized in it. The standby home location register 110 uses the backup database with a state that is renewed by the last periodic backup process (i.e. the last short period subscriber data backup). This is because the congestion is happened in the active home location register 101 and the standby home location register 101 can not renew the database about the divided set memorized in it.

Figure 6:
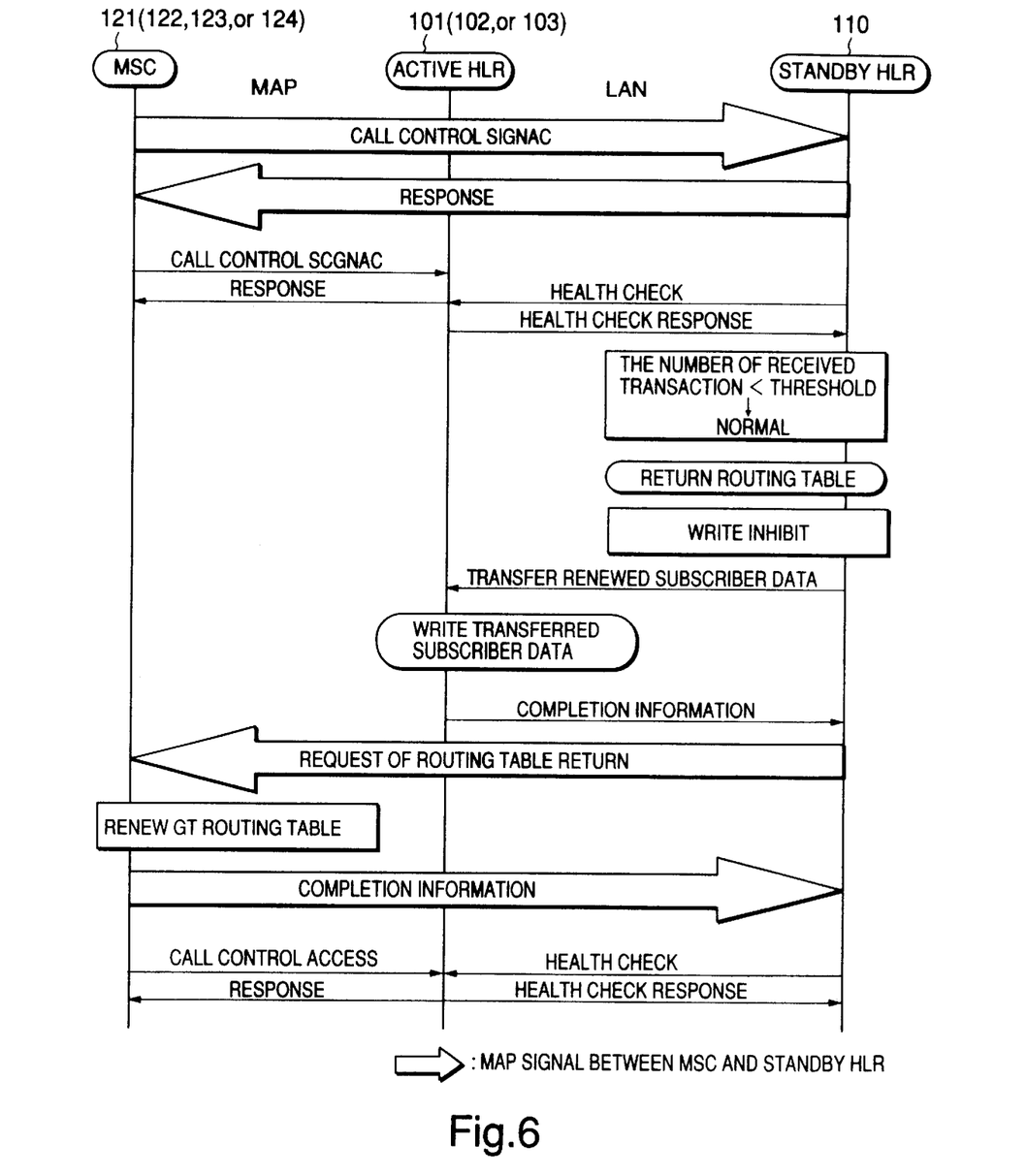
FIG. 6 is a sequence chart for describing the operation of the register controller of FIG. 1.

Referring to FIG. 6, the home location register control 140 carries out the return process when it judges the congestion is dissolved. The subscriber data units of the designated rage are rewritten by the call control signals transmitted from the mobile services switching centers after the change of GT routing tables of the mobile services switching centers. Accordingly, the contents of the subscriber data units memorized in the active home location register 101 are different from the contents of the backup database of the standby home location register 110. Then, the standby home location register 110 inhibits rewriting the subscriber data units of the backup database and transmits the rewritten subscriber data block(s) of the designated range to the active home location register 101.

The active home location register 101 renews the subscriber data units by the use of the rewritten subscriber data block(s). Then, the active home location register 101 informs the standby home location register 110 of the completion.

The home location register controller 140 orders the all of the mobile services switching centers to return the GT routing table into the original state. The mobile services switching centers returns the GT routing table into the original state and informs the completion to the home location register controller 140.

Therefore, the congestion is promptly dissolved without restriction of the call control signals. Moreover, the standby home location register is effectively used in the mobile communication system.

In addition, the mobile communication system promptly deals with the congestion because the standby home location register periodically renews the database. It is easy to return the mobile communication into the normal operation because the standby home location register transmits the subscriber data block(s) to the active home location register that the congestion is happened.

While this invention has thus for been described in conjunction with the preferred embodiment thereof, it will readily be possible for those skilled in the art to put this invention into practice in various other manners. For example, the communication system may be a mobile telephone system. Moreover, the home location register controller may be included in the standby home location register or may be connected to the local area network. In addition, the number of the active home location register(s) may be one or more. Similarly, the number of the mobile services switching center(s) may be one or more.

What is claimed is:

1. A home location register controller used in a mobile communication system including a mobile services switching center, an active home location register connected to said mobile services switching center, and a standby home location register connected to said active home location register, said home location register controller comprising:

monitoring means connected to said active home location register for monitoring simultaneous access from said mobile services switching center to said active home location register to produce a monitoring signal representative of the number of the simultaneous access, and control means connected to said monitoring means and said mobile services switching center for deciding whether congestion is happened in said active home location register or not on the basis of the monitoring signal to partially change destination of access produced by said mobile services switching center from said active home location register to said standby home location register.

2. A home location register controller as claimed in claim 1, wherein said monitoring means periodically supplies a health check signal to said active home location register to obtain a health check response and to produce the monitoring signal in response to the health check response.

3. A home location register controller as claimed in claim 1, said mobile services switching center having a routing table to access said active home location register, wherein said control means orders said mobile services switching center to partially change content of the routing table so that said mobile services switching center can access both said active home location and said standby home location register.

4. A home location register controller as claimed in claim 1, said active home location register storing subscriber data which is rewritten by the mobile services changing center, wherein said control means periodically make said standby home location register gather the subscriber data from said active home location register when said active home location register is out of a congested condition.

5. A home location register controller as claimed in claim 1, said standby home location register storing subscriber data which is rewritten by the mobile services changing center, wherein said control means makes said standby home location register supply the subscriber data to said active home location register when the congestion of said active home location register is dissolved.

6. A method of controlling a home location register system having an active home location register and a standby home location register connected to each other, said home location register system used in a mobile communication system including a mobile services switching center connected to said active home location register, said method comprising the steps of:

monitoring simultaneous access from said mobile services switching center to said active home location register to produce a monitoring signal representative of the number of the simultaneous access, deciding whether congestion is happened in said active home location register or not on the basis of the monitoring signal, and partially changing destination of access produced by said mobile services switching center from said active home location register to said standby home location register.

7. A method of controlling a home location register system as claimed in claim 6, wherein the monitoring step comprise the steps of:

periodically supplying a health check signal to said active home location register to obtain a health check response and, producing the monitoring signal in response to the health check response.

8. A method of controlling a home location register system as claimed in claim 6, said mobile services switching center having a routing table to access said active home location register, wherein said partially changing step comprises the step of ordering said mobile services switching center to partially change content of the routing table so that said mobile services switching center can access both said active home location and said standby home location register.

9. A method of controlling a home location register system as claimed in claim 6, said active home location register storing subscriber data which is rewritten by the mobile services changing center, wherein said method further comprises the step of periodically making said standby home location register gather the subscriber data from said active home location register when said active home location register is out of a congested condition.

10. A method of controlling a home location register system as claimed in claim 6, said standby home location register storing subscriber data which is rewritten by the mobile services changing center, wherein said method further comprises the step of making said standby home location register supply the subscriber data to said active home location register when the congestion of said active home location register is dissolved.

11. A recording medium having a recorded program for controlling a home location register system having an active home location register and a standby home location register connected to each other, said home location register system used in a mobile communication system including a mobile services switching center connected to said active home location register, said recorded program comprising:

monitoring process for monitoring simultaneous access from said mobile services switching center to said active home location register to produce a monitoring signal representative of the number of the simultaneous access, and control process related to said monitoring process for deciding whether congestion is happened in said active home location register or not on the basis of the monitoring signal to partially change destination of access produced by said mobile services switching center from said active home location register to said standby home location register.

12. A recording medium as claimed in claim 11, wherein said monitoring process comprises transmitting process for periodically transmitting a health check signal to said active home location register, receiving process for receiving a health check response signal from said active home location register, and producing process related to said receiving process for producing the monitoring signal in response to the health check response.

13. A recording medium as claimed in claim 11, said mobile services switching center having a routing table to access said active home location register, wherein said control process comprises ordering process for ordering said mobile services switching center to partially change content of the routing table so that said mobile services switching center can access both said active home location and said standby home location register.

14. A recording medium as claimed in claim 11, said active home location register storing subscriber data which is rewritten by the mobile services changing center, wherein said control process comprises first making process for making said standby home location register gather the subscriber data from said active home location register when said active home location register is out of a congested condition.

15. A recording medium as claimed in claim 11, said standby home location register storing subscriber data which is rewritten by the mobile services changing center, wherein said control process comprises second making process for making said standby home location register supply the subscriber data to said active home location register when the congestion of said active home location register is dissolved.

* * * * *